Figure 1:
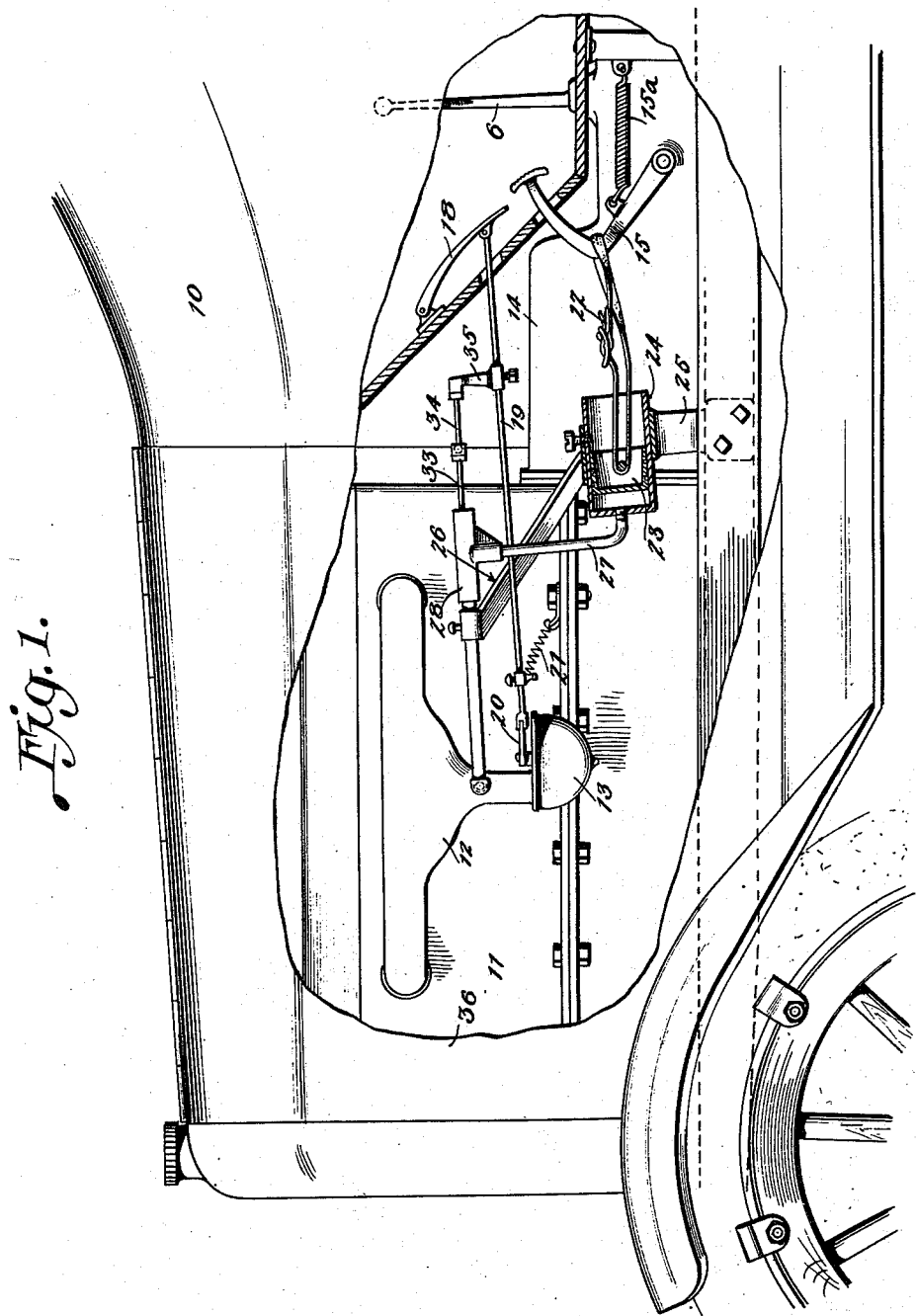

Oct. 9, 1923.　　　　　　　　　　　　　　　　1,470,272
R. I. BELCIA
ENGINE CONTROLLED CLUTCH RELEASING MEANS
Filed Dec. 9, 1919　　　　2 Sheets-Sheet 1

WITNESSES

INVENTOR
R. I. BELCIA,
BY
ATTORNEYS

Oct. 9, 1923.
1,470,272
R. I. BELCIA
ENGINE CONTROLLED CLUTCH RELEASING MEANS
Filed Dec. 9, 1919    2 Sheets-Sheet 2
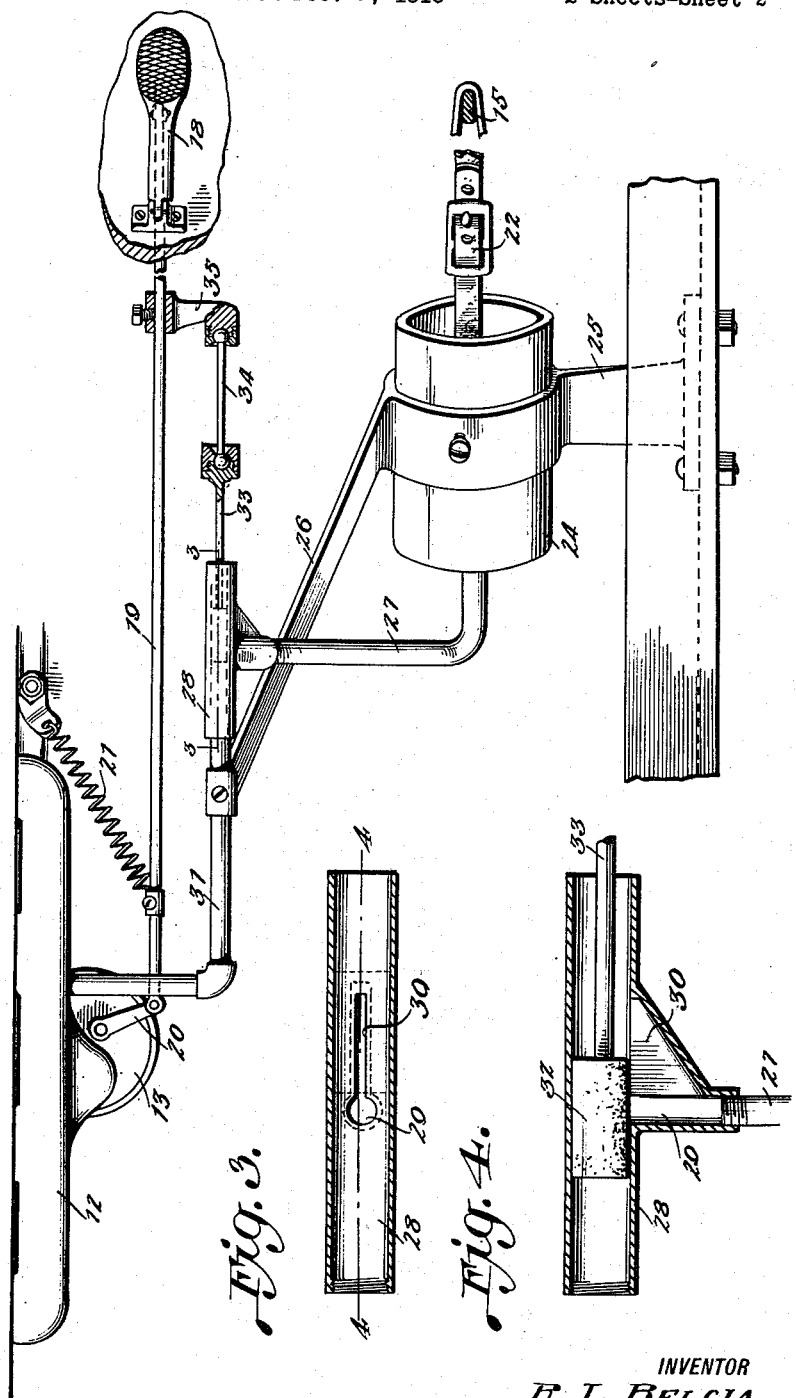
INVENTOR
R. I. BELCIA,
BY
ATTORNEYS Patented Oct. 9, 1923.

1,470,272

UNITED STATES PATENT OFFICE.

ROSS IVANHOE BELCIA, OF GED, LOUISIANA.

ENGINE-CONTROLLED CLUTCH-RELEASING MEANS.

Application filed December 9, 1919. Serial No. 343,580.

*To all whom it may concern:*

Be it known that I, ROSS IVANHOE BELCIA, a citizen of the United States, and a resident of Ged, in the parish of Calcasieu and State of Louisiana, have invented certain new and useful Improvements in Engine-Controlled Clutch-Releasing Means, of which the following is a specification.

My present invention relates generally to automobiles and motor cars and more particularly to the gear control thereof, my object being the provision of means by which to dispense with the manual depression of clutch pedals so as to avoid the nervous strain attendant upon gear shifting or stopping the car, and consequently to promote comfort and ease in controlling the same.

More particularly my invention proposes the engine actuation of the clutch pedal to released position under manual control so that in shifting gears and in stopping the car, it will not be necessary for the operator to manually depress the clutch pedal, particularly those pedals operating in connection with clutches whose nature is such as to require the use of heavy springs against the tension of which the movable clutch member must be shifted to released position.

In carrying out my invention, I propose manually controlled means to utilize the suction of the engine for the purpose of holding the clutch in released position when the engine is in movement, as long and only as long as the accelerator pedal is in retracted position.

In the accompanying drawings which illustrate my present invention and form a part of this specification;—

Fig. 1 is a side view, the parts being broken away and in section, illustrating my invention in its practical application, Fig. 2 is a top plan view, Fig. 3 is a horizontal section on line 3—3 of Fig. 2 with the valve member removed, Fig. 4 is a vertical section on line 4—4 of Fig. 3, with the valve member in place.

Referring now to these figures, I have generally indicated the forward portion of an automobile at 10 in Fig. 1, the engine being shown at 11, the intake manifold at 12, the carbureter at 13, the clutch housing at 14, the clutch pedal at 15, and a gear shifting lever at 16.

The clutch pedal projects through the foot board 17 as usual, upon which is also mounted an accelerator pedal 18 having a stem 19 projecting forwardly to the throttle arm 20 at the carbureter, and normally held in retracted position by means of a spring 21.

In accordance with my invention the clutch pedal 15 is connected by a flexible member or strap 22 to a piston 23 mounted within a piston cylinder 24 suitably supported by a bracket 25 from which a bracket arm 26 projects upwardly adjacent to one rear side portion of the engine 11.

The cylinder 24 is open at one end and its opposite closed end has a pipe 27 connected thereto in communicating relation. This pipe leads to a tubular valve casing 28 shown in detail in Figs. 3 and 4 with which it has communication through an opening 29 and a slot 30 extending rearwardly from the opening, as particularly seen in Fig. 3.

At one end the valve tube 28 is open to the atmosphere and at its opposite end is connected to one end of a vacuum pipe 31 supported by the bracket arm 26 and connected at its opposite end to the intake manifold 12 as shown in Figs. 1 and 2.

Within the valve tube 28 is slidably disposed a cylindrical valve member 32 having a rearwardly projecting stem 33 having connection by means of a universal connecting rod 34 with a bracket 35 one end of which is securely fastened to the stem 19 of the accelerator pedal 18.

These several connections as proposed by my invention are all mounted adjacent to the rear portion of the engine 11, beneath the automobile hood 36 and thus normally concealed from view, the clutch pedal 15 remaining as it usually is, in order that the parts may be actuated manually as in the ordinary construction, should the engine actuated parts fail.

The parts are furthermore connected so that with the accelerator pedal 18 in its fully retracted position, without pressure thereon, the valve member 32 is positioned in the dotted line position of Fig. 3, covering the slot 30 and placing the closed end of the cylinder in communication with the intake pipe 12. The suction of the engine thus acts through the pipes 31 and 27 and the forward portion of the valve tube 28, to hold the piston 23 in its forward position, pulling the clutch pedal 15 to released position. In this position the machine is obviously in condition for shifting the gears by the manual gear shifting lever 16, or for the application of the brakes to bring the car to a standstill.

If the accelerator pedal 18 has been released for movement to its rearmost position for the purpose of shifting gears, it is obvious that after the shifting has been made and the accelerator pedal is again depressed to speed up the engine, the valve member 32 will be shifted forwardly until it gradually closes the opening 29 and as gradually opens communication between pipe 27 and the uncovered slot 30 so as to place the forward closed end of cylinder 24 in communication with the atmosphere. Thus, the clutch being released in effect from the engine actuated parts, its spring 15 will draw the same to the clutched position completing the connection of the engine with the rear wheels of the vehicle.

As before stated, the connections are such that should they fail for any reason, it is still possible to operate the clutch as it is ordinarily done, and it will be observed that these connections are simple, inexpensive, capable of ready repair and substitution and may be made as strong and durable as service connections dictate.

I claim:—

1. The combination with an automobile motor having an intake manifold, a carbureter, an accelerator connected with the carbureter, and a clutch pedal, of a piston having a flexible connection with the clutch pedal, a cylinder in which the piston is movable having a closed end in advance of the piston, a suction pipe leading from the intake manifold to the closed end of the cylinder, and a valve in the suction pipe connected with and controlled by the accelerator pedal and normally positioned to open communication between the intake manifold and the said cylinder when the accelerator is in retracted position.

2. The combination with an automobile motor having an intake manifold, a carbureter, an accelerator connected with the carbureter, and a clutch pedal, of a piston having a flexible connection with the clutch pedal, a cylinder in which the piston is movable having a closed end in advance of the piston, a suction pipe leading from the intake manifold to the closed end of the cylinder, and a valve tube in the suction pipe having a port leading to the atmosphere for communication with the cylinder, and a valve movable in said valve tube and connected to the accelerator, said valve being normally positioned to close the air port and place the cylinder in communication with the intake manifold when the accelerator is in fully retracted position.

3. The combination with an automobile motor having an intake manifold accelerator, and a clutch pedal, of a piston cylinder, a piston therein flexibly connected to the clutch pedal and an accelerator controlled suction connection between the said cylinder and the intake manifold arranged to place the cylinder in communication with the intake manifold when the accelerator is in fully retracted position and to cut off such communication when the accelerator is advanced to speed up the engine.

4. The combination with an automobile motor having an intake manifold, accelerator and clutch pedal, connections actuated by the suction of the engine and in communication with the intake manifold for shifting the clutch pedal to released position when the accelerator is fully retracted, and means actuated by the accelerator in its advancing movement for rendering said first named connections inactive to permit the clutch to shift into engaged position when the engine is speeded.

5. The combination with an automobile motor, having a clutch and an accelerator, of accelerator controlled means for shifting the clutch to released position while the engine is running at slow speed and for releasing the clutch for movement to engaged position when the engine is speeded.

6. The combination with an automobile motor having a clutch, of engine controlled connections for holding the clutch in released position while the engine rotates at minimum speed, including means for releasing the clutch for movement to engaged position when the engine speed is increased, said means permitting free manually actuated clutch movements while the clutch is released.

7. The combination with an automobile motor having a throttle and a clutch, of means controlled by the throttle for automatically holding the clutch in disengaged position at minimum motor speed arranged to release the clutch for movement to engaged position when the speed of the motor is increased.

8. The combination in a motor car, of an internal combustion engine, a clutch controlling element, a movable appliance to impart clutch-disengaging movement to said element, a conduit between said appliance and the intake manifold of the engine, and a valve for opening communication through such conduit to effect clutch-disengaging movement of said appliance.

9. The combination in a motor car, of the intake manifold, a clutch-mechanism element, a gas throttle, a cylinder, a piston in the cylinder, means for transmitting power from the piston to effect unclutching movement of said element, a valve mechanism connected to the intake manifold and cylinder, and means for operating the valve to opened position to effect throttle declutching operation of said piston.

10. The combination in a motor car, of the intake manifold, a clutch-mechanism element, a gas throttle, a cylinder, a piston in the cylinder, means for transmitting power from the piston to effect unclutching movement of said element, a valve mechanism connected to the intake manifold and cylinder, means for operating the valve to opened position to effect throttle declutching operation of said piston, and for closing said valve and opening communication between the atmosphere and said cylinder to permit clutch-engaging operation of said element.

11. The combination in a motor car, of an internal combustion engine, a clutch controlling element, a movable appliance flexibly connected to said element, a conduit between said appliance and the intake manifold of the engine, and a valve for opening communication through such conduit to effect clutch-disengaging movement of said appliance.

12. The combination with an internal combustion engine having a throttle controlled intake manifold, a clutch connecting the engine with the driven mechanism, a vacuum cylinder, a piston therein operatively connected with the clutch, an exhaust conduit leading from the cylinder to the intake manifold whereby the cylinder is exhausted by the suction of the engine, and an air supply port to the cylinder controlled by the adjustment of the engine throttle.

13. The combination with an internal combustion engine having a throttle controlled intake manifold, a clutch connecting the engine and a driven mechanism, vacuum operable means for operating the clutch, an exhaust connection between the vacuum operable means and the intake manifold thru which the vacuum is induced by the suction of the engine, and an air supply port leading to the vacuum operable means opened and closed by the throttle control means.

14. The combination with an internal combustion engine having a throttle controlled inlet manifold, a clutch connecting the engine with a driven mechanism, and vacuum operable actuating means for the clutch controlled by the operation of the engine, adapted to automatically disconnect the clutch when the engine throttle is closed and permit the re-engagement of the clutch when the engine throttle is opened.

ROSS IVANHOE BELCIA.